March 8, 1938.   S. S. GREEN   2,110,417
ELECTRIC METER
Filed Feb. 8, 1937   2 Sheets-Sheet 1

Inventor:
Stanley S. Green,
By Louis Robertson
Atty

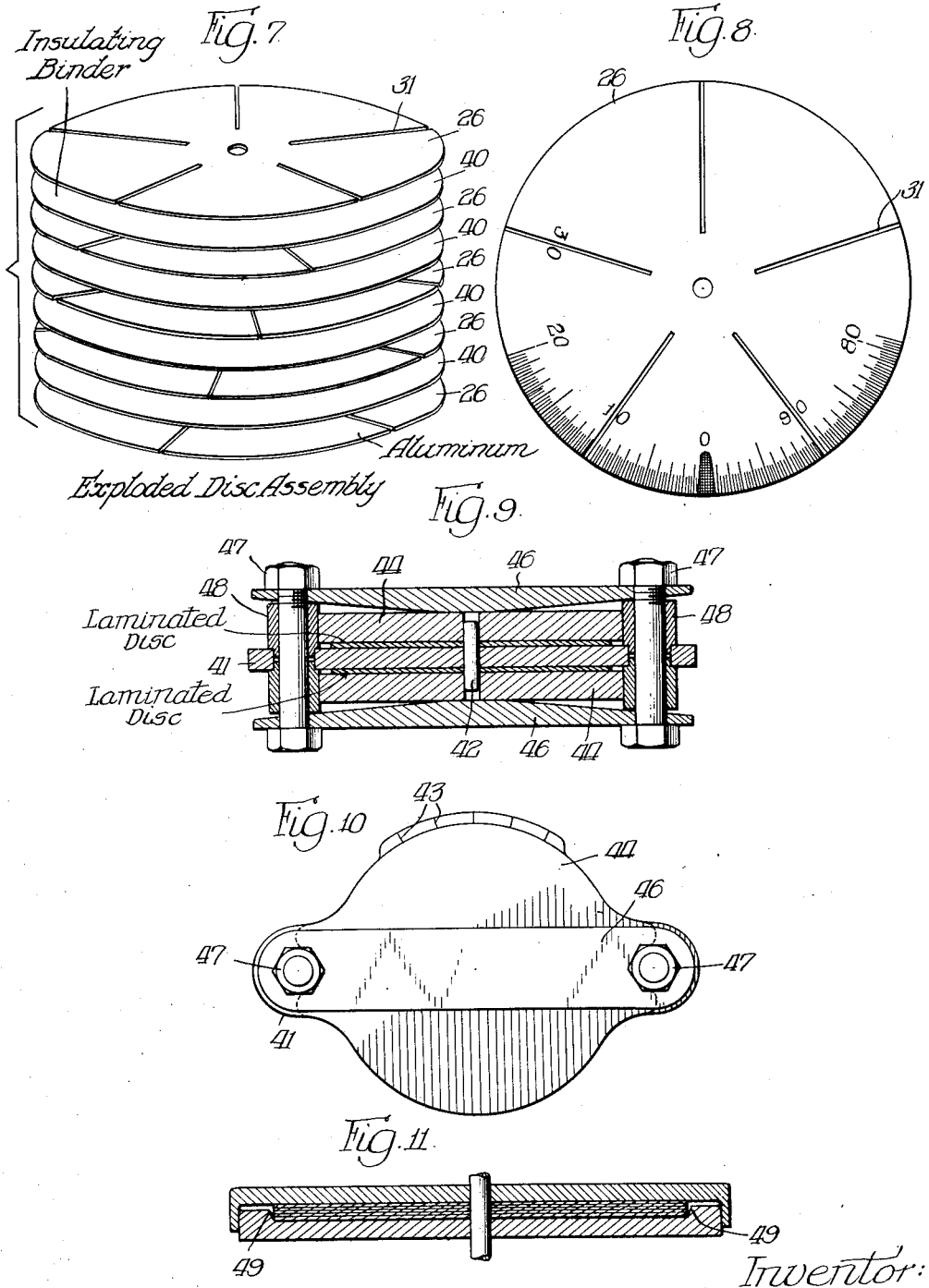

Patented Mar. 8, 1938

2,110,417

UNITED STATES PATENT OFFICE 2,110,417

ELECTRIC METER

Stanley S. Green, La Fayette, Ind., assignor to Duncan Electric Manufacturing Company, La Fayette, Ind., a corporation of Illinois Application February 8, 1937, Serial No. 124,632

12 Claims. (Cl. 171—264)

This invention relates to electric watt-hour meters and more particularly to such meters having a plurality of meter elements such as are used for measuring the consumption of electric energy in polyphase circuits.

Polyphase meters differ from single phase meters by employing two or more complete electromagnetic driving elements, while the usual single phase meter has only one. Polyphase circuits have at least three wires and at least two meter driving elements are required for their measurement.

The use of a plurality of meter driving elements has heretofore made such meters very expensive, largely because of the fact that it was necessary to use a separate disc for each such element in order to prevent interference between the various elements. It should be understood that, as illustrated in Fig. 2, a single driving element includes two alternating current magnets, one excited by the current and the other by the potential of the circuit to be measured, each of which induces currents in the meter disc. In fact, the disc is driven by means of the reaction between the field of one magnet and the currents induced in the disc by the other magnet of the same driving element. If another driving element is acting on the same disc there will be similar reactions between the magnetic fields of one element and the currents induced in the disc by the other element, as illustrated in Fig. 3.

In Europe, polyphase meters having two elements applied to one disc have been used, but because of the above described interference, such meters have never been sufficiently accurate to meet the standards of accuracy in this country. There have been various suggestions for overcoming the interference.

One construction which has been used abroad is a meter in which the center portion of the disc is made of insulation. This, however, is largely ineffective since the currents set up in the disc still circulate freely through the annular conductor portion, and consequently the stray currents from one element are still affected by the other element.

It has also been proposed to provide annular grooves on the faces of the disc to keep the stray currents flowing concentrically with respect to the disc, this direction having been assumed to be harmless. Such grooves, however, have been ineffective since even a thin web at the bottom of the groove is too good a conductor to confine the currents to the concentric paths. If the groove were replaced by concentric slots entirely through the disc, and if the slots were placed close enough together to adequately confine the stray currents to the concentric paths, the efficiency of the disc would be very seriously impaired, since the useful currents as well as the stray currents would be cut off.

A variation of the two-disc meter has been suggested, in which one disc was an annular disc mounted in the plane of and surrounding the other. If the smaller disc is large enough for the element applied thereto to provide adequate torque, the larger disc must be too large for economy, especially if the discs are made large enough so that the element applied to one disc does not unduly affect the other disc.

From the foregoing it is seen that there has been in the meter art a recognized and baffling problem of providing a polyphase meter having two elements on one disc without undue interference between the magnetic fields of one element and the currents set up in the disc by the other. The present invention has solved this problem on the principle of providing slots extending inwardly from the periphery of the disc, the number, length, and positions of the slots being such that the disc currents induced by one driving element cannot flow into the field of another driving element. This principle is illustrated in Fig. 4. Such slots prevent interference between the driving elements but if, as shown in Fig. 4, they extend entirely through the disc, or if they extend into the disc far enough to prevent interference, they also tend to prevent proper driving of the disc by the driving elements. In accordance with this invention this difficulty is overcome by providing a laminated disc having each lamination slotted as described, and staggering the slots so that all of the slots of all of the discs are distributed evenly around the periphery of the disc.

The theoretical general principle above stated was set forth in German Patent No. 433,189, for which application was filed September 13, 1923. The meter of that patent was never built commercially. Its owners have attempted to solve the problem along other lines, and it did not teach the world how to make the theory commercially practical nor even that this could be done. Those knowing the requirements of a meter disc still considered the idea of a slotted laminated disc to be preposterous.

In applicant's copending application, Serial No. 33,116, filed July 25, 1935, he disclosed a practical solution to the problem using the general principle discussed above, together with a variety of other features, some of which are necessary to make this principle practical instead of preposterous. Each of these novel features is an invention in itself which is an important aid in making the invention commercially practical. The present application, which will probably issue as a patent in place of application Serial No. 33,116 and is a continuation in part of said application, includes these features and certain other features which will facilitate manufacture or provide a preferred way to avoid difficulties due to abnormal conditions. One of these, the use of a high coercive metal in the permanent damping magnets, is covered in applicant's co-pending application, Serial No. 70,951, but is mentioned here nevertheless for the sake of completeness of disclosure. It is contemplated to have these two applications issue simultaneously so that they may be considered as one patent.

The objects of the invention are apparent from the foregoing discussion, but in summary they are to provide a satisfactory polyphase meter having a plurality of elements operating on one disc without interference.

In the drawings, in which I have illustrated one example of such a meter together with the method of making a disc for use therein, Fig. 1 is a diagrammatic illustration of the meter, showing its connections.

Fig. 7 is a somewhat diagrammatic view showing the structure and assembly of a preferred form of disc.

Fig. 8 is a face view of a lamination in the structure of Fig. 7, showing also one form of stroboscopic markings that may be applied to the finished disc.

Figs. 9 and 10 are respectively a sectional view and a plan view showing one form of baking clamp; and Fig. 11 is a fragmentary view similar to Fig. 9 but showing another form of baking clamp.

Figure 1:
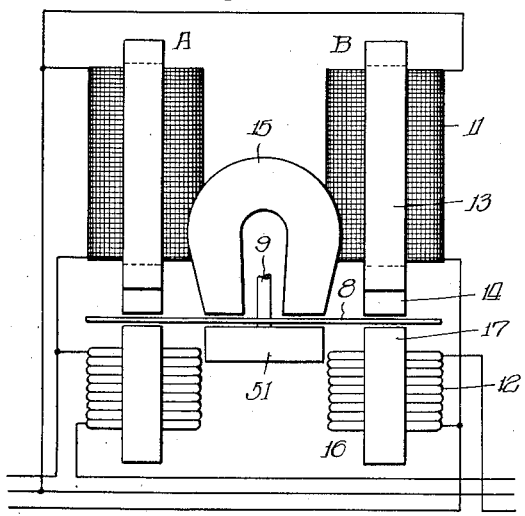
Figure 2:
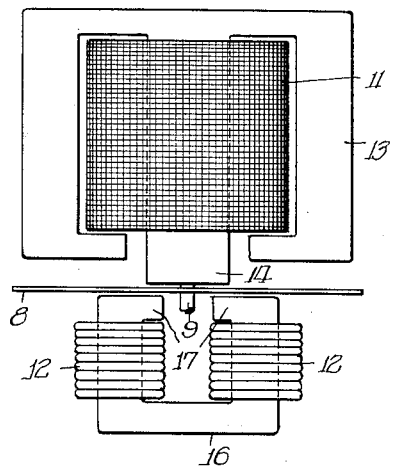
Fig. 2 is a diagrammatic illustration of conventional cores for the magnets of a single driving element, showing their application to the disc.

Although this invention may take many embodiments, only one has been chosen for the purpose of illustration and it is shown diagrammatically. The invention includes a meter disc 8 carried by a rotatable shaft 9 to which may be geared a conventional meter register, not shown. The disc is driven by two magnetic driving elements A and B, or more if necessary, each element including a potential magnet 11 responsive to the voltage across one pair of conductors, and a current magnet 12 responsive to the current carried by one of the conductors of that pair. Conventional connections for such elements are illustrated in Fig. 1. The potential magnet includes a laminated core 13 having a pole piece 14 located as closely as practicable to one face of the meter disc. The current magnet includes a laminated core 16 having pole pieces 17 located as closely as practicable to the other face of the meter disc. Movement of the disc is opposed by one or more damping magnets 15, preferably positioned between the driving elements as shown in Fig. 4.

Figure 3:
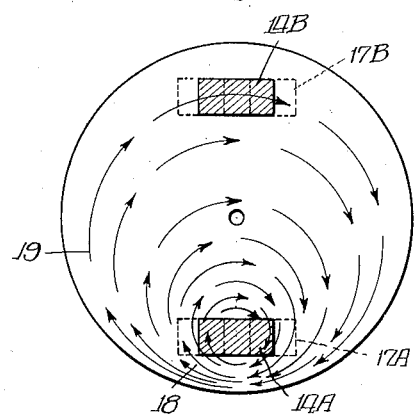
Fig. 3 is a diagrammatic illustration for explaining the interference between two electromagnetic driving elements applied to one disc of the conventional type.

In Fig. 3 is illustrated a meter disc together with two magnetic driving elements, the potential poles 14A and 14B of the two elements being shown in full lines to designate their being above the disc as viewed, and the current poles 17A and 17B being represented by dotted lines to indicate their being below the disc. The damping magnets have not been shown in Fig. 3 since they do not cause interference error, their magnetic fields being constant. The lines of arrows on the face of the disc in this figure represent the current induced in the disc by changing magnetism of the pole 14A. Pole 14B with its own set of currents could have been chosen for illustration just as well. The arrows 18 which are concentrated in the vicinity of the poles 14A represent the useful induced current, while the arrows 19 passing through the vicinity of poles 14B and 17B represent the stray currents which cause the interference. These arrows are not intended to be accurate either as to direction or distribution.

The meter is driven by forces such as arise when the currents 18 cross the field of the poles 17A, but in like manner there will inevitably be a driving or retarding effect as a result of the currents 19 crossing the fields of the poles 14B and 17B. This latter effect is of course undesirable and makes the meter inaccurate.

Figure 4:
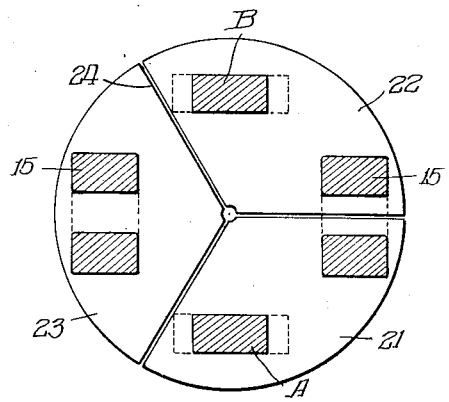
Fig. 4 is a diagrammatic illustration of a disc acted on by two driving elements but slotted to prevent interference between the elements.

In Fig. 4 the disc has been represented as trisected to provide three segments 21, 22 and 23 which are completely isolated electrically from one another. With the disc in the position shown, the magnet A operates on segment 21 and the magnet B operates on the segment 22, each being isolated from the other. It will be seen that no matter what the position of the disc, the two elements A and B will operate mainly on segments electrically isolated from one another. Thus, the stray currents 19 are substantially eliminated by the slots 24 between the segments which will not let such currents pass from one segment to the other.

One difficulty with such a disc is that the slots will cause it to run very unevenly and even stop at light loads. With some meters 40% of the normal load would be necessary to prevent such stopping. It has long been known that if a meter has too little friction to keep its disc from creeping under no-load conditions, a tiny hole in the disc would stop it. A slot such as 24 corresponds to a very large hole in the disc and has a correspondingly large effect.

Figure 6:
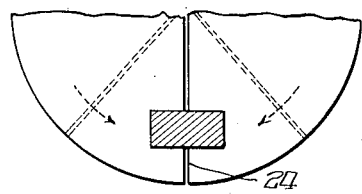
Fig. 6 is a fragmentary diagrammatic illustration showing the position to which a single pole will draw the disc of Fig. 4.

An explanation of this effect of a slot in a disc is that each pole considered alone has a strong tendency to draw the slot to it to the position shown in full lines in Fig. 6. If a single pole were provided and the other poles omitted, it would draw to it whichever slot was closest, and in so doing might turn the disc in either direction, as is indicated by the two arrows across the two dotted line positions of the slot shown in Fig. 6. Obviously, any disc in which this "dead center" effect is pronounced, is entirely out of the question for practical use, even though the slots eliminate interference. The knowledge of this possible effect, and an assumption that there would also be a severe loss of torque have helped to make the idea of a slotted disc seem preposterous prior to the applicant's invention.

In Figs. 7 and 8, however, has been illustrated an entirely practical composite disc embodying the interference eliminating slot principle of Fig. 4. The "dead center" effect introduced by the slots is eliminated by providing a plurality of laminations 26 which may be identical with one another, and similar to the structure of Fig. 4, but positioned so that the slots 31 of the various laminations are staggered or spaced around the disc. This spacing is desirably equal so that a symmetrical arrangement of all slots is obtained.

It will be observed that, as seen best in Fig. 7, the various segments of one lamination are not completely isolated, since the slots do not quite extend to the center of the disc. The segments may be regarded as substantially electrically isolated or separated, however, since it has been found that a small width of approximately a third of an inch of connecting metal between the slot and the shaft carrying the disc is substantially harmless. This connecting metal is very advantageous from the standpoint of production, permitting assembly of the disc by laminations instead of by segments. Of course, some very slight further advantage may be obtained as the segments are more completely isolated from one another electrically, and, if the number of slots is decreased, the distance of the slots from the center of the disc should probably be decreased. However, the "Code for Electricity Meters" which for many years has been the standard in this country for acceptance tests for watt-hour meters allows a 1% error due to interference between driving elements, as determined by tests therein prescribed. A laminated disc formed with five segments connected by webs of only one-third of an inch at the center can reduce the interference error from approximately 5% to a commercially negligible value well below the 1% allowed. On the other hand, tests have indicated that, at least when the segments are connected at the center of the disc, any appreciable conductance between the segments at the periphery of the disc is extremely harmful.

The laminations 26 are made up preferably of a nonmagnetic metal having high conductivity, aluminum being preferred on account of its light weight. The sheet from which the laminations are cut or stamped may be obtained in any desired thickness, even less than .001 inch if necessary. A thickness of .008 inch is now preferred, since five laminations are desired for reasons discussed below. It is desirable that the composite disc be not over approximately .06 inch in thickness to permit the retention of small magnet gaps. A thickness of .05 inch or less is preferred. The slots may be of any width desired, $\frac{3}{32}$ of an inch now being preferred.

*Insulation of laminations and manufacture of discs*

Extreme care must be taken in insulating the laminations from one another except at the central portion, by which is meant approximately that portion radially inside of the slots. The problem of insulation is made difficult by virtue of the desirability for a thin disc and one in which the laminations are held in place very firmly so that there is no danger of their curling, warping or otherwise causing trouble. It may be explained that thinness and dependability as to solidity and shape over long periods of time and under varying conditions of temperature and humidity are both made vital by virtue of the fact that the magnetic gaps through which the disc rotates must be quite narrow in order to obtain adequate flux intensity with efficiency. If the magnetic gaps have to be widened for thicker insulation or for greater tolerance in case of surface buckling or warping, there is some loss. It is for these reasons that, as stated before, the idea of a laminated disc has seemed preposterous prior to applicant's invention.

It has been found that the best manner of insulating the laminations is with a polymerizable insulating binder, preferably together with a preformed sheet separator such as paper. A paper separator and insulator 40 of .002 inch thickness has been found very satisfactory, although thinner or thicker papers can be used. It is desired however that at least ¾ of a .05 inch composite disc thickness be conductive metal to provide adequate torque. Shellac has been found to be an excellent insulating binder, although a varnish known as "Bakelite" varnish made of the synthetic resin commercially known as "Bakelite" and a solvent can also be used satisfactorily.

There are various ways in which the shellac or varnish may be applied. One is to spray the surfaces of the aluminum laminations (except the outside surface of each of the two end laminations) with a coating of the shellac or varnish, which may be allowed to dry so as not to be sticky in handling. A preferred way, however, is to dip sheets of paper into a vat of the shellac or varnish and remove them slowly so as to obtain an even distribution of the shellac. After the sheets have dried, the round separators may be cut therefrom as by stamping. The consistency of the shellac or varnish may be so regulated that the paper will retain just enough of the shellac or varnish to not only saturate the paper but also fill the slots of the laminations subsequently applied thereto without being enough to be squeezed out objectionably at the periphery of the disc.

In assembling the disc, a mold or clamp such as that shown in Figs. 9 and 10 may be used. This form of clamp includes a center plate 41 from which a pin 42 projects on both sides so that a disc may be assembled on each projecting end thereof. It may be desirable to first apply to the plate 41 a separator of a material such as that known commercially as "Cellophane" to keep the disc from sticking to the plate 41. Thereafter the slotted laminations 26 of Fig. 7, after being chemically cleaned, are applied over the pin 42, and between each pair of laminations is applied a paper separator 40. As each slotted lamination is applied, its slots are positioned adjacent successive markers 43 on the plate 41 so that in the finished disc they will be evenly staggered in angular position. Positioning means engaging the slots or special formations could be provided to insure accuracy. After the desired number of laminations have thus been applied, another "Cellophane" separator may be applied and then an outer clamp plate 44 may be applied. A second disc may be assembled in similar manner on the reverse side of the center plate 41 and the second outer clamp plate 44 applied thereto. The spring straps 46 may then be applied and tightened to the extreme position with the nuts 47, the tension being limited by the spacing and guiding bushings 48.

While the discs are held flat and under pressure, they should be baked in an oven a sufficient time and at a sufficient temperature first to cause the shellac or varnish to become quite fluid and subsequently to become set as the polymerizing process begins. A temperature of 140° C. and a baking time of 90 minutes have been found desirable with shellac for this phase of the process. While the shellac or varnish is fluid, it will flow sufficiently to insure impregnation of the separators and to form with the separators an insulating binding layer intimately adhering to the aluminum laminations and securing them together.

Either as a continuation of the same baking step or as a separate step (with many discs stacked and clamped together so as not to require so many clamps) the shellac or varnish should be further baked for a sufficient time and at such a temperature as to be thoroughly polymerized. In the case of shellac, this may be done by baking 15 more hours at a temperature of 125° C., although the time and temperature are subject to considerable variation, as is well known. The Cellophane separator should then be removed and hubs or shafts may be applied to the discs in any suitable manner. The hubs will naturally connect the laminations together electrically, but this is harmless, being at the center of the disc. The polymerization renders the binder insoluble and prevents it from subsequently softening at the higher temperatures it may encounter and prevents the discs from warping in service. Any undesirable excess of the binder which may have been extruded at the edge of the disc may be trimmed off with a sharp cutting tool.

Another consideration which makes adequate insulation of the laminations difficult is the surprisingly high degree of insulation which is necessary throughout the outer portion of the disc. It has been found that even the burrs produced in stamping the laminations from the sheets can apparently cause serious trouble by cutting through the insulation. It is, therefore, desirable that the burrs be removed as by pressing the laminations between polished flattening dies. If the laminations are to be sprayed, the burrs should be removed first. This also has an advantage of substantially removing any tendency of the metal to curl.

Stroboscopic marking

It is customary to form very small teeth resembling gear teeth on the peripheral edge of meter discs for the purpose of stroboscopic measurements of speed in testing the meters. These could be cut in the edge portion of the disc if desired, but it is preferred at present to etch the top lamination of the disc and then print suitable markings thereon after the disc has been assembled. This has the advantage that the markings may be more prominent than is practical with teeth and may, in addition to their stroboscopic function, act as a scale with the usual scale type of calibrations including convenient numerals. In fact, as is illustrated in Fig. 8, the calibrations may be in accordance with a decimal system so that meter error may very easily be figured on a percentage basis.

In Fig. 11 a mold construction has been shown which includes side portions 49 which may be cut with teeth thereon so that if a sufficient excess of the shellac or varnish is applied to the disc it will ooze out and be molded by the teeth to form stroboscopic teeth. The side portions 49 may also serve to limit the amount to which the disc is compressed while the varnish or shellac is fluid and thus possibly make the paper separators unnecessary, although at present it is preferred that they be used in any event. Of course, the mold of Fig. 11 could be a double mold as is the mold of Fig. 9, if preferred.

Number of slots and number of laminations

Although the disc has been illustrated as including five conductive laminations each with five slots, neither of these numbers is vital. The total number of slots, if evenly staggered, will largely determine the uniformity of torque of a driving element acting on a disc, and approximately 25 slots is believed to be about an ideal number. This number results in substantially uniform torque and additional slots would result in only very slight improvement. As a matter of fact, even 15 slots would be fairly satisfactory. It appears that regardless of the number of laminations, the slots should be positioned uniformly around the disc, though variations in the slots or other considerations might avoid this generalization.

Any given number of slots, producing any given degree of uniformity, may be obtained in a variety of ways. In other words, slots can be added by adding more slots to each lamination or by adding laminations. Disregarding momentarily the disadvantage of having an even number of slots per lamination, which will be discussed later, an effect approximately corresponding to 25 slots could be obtained with three laminations each having eight slots or two laminations each having twelve slots, but more than three laminations to obtain this degree of uniformity is greatly preferred, since it permits having fewer slots per laminations. The advantage of having fewer slots per lamination can be seen from Fig. 5, in which, referring to the lower of the two charted lines, it is seen that the driving torque is reduced as the number of slots per lamination is increased. Thus, with five slots, as in the preferred construction, the driving torque is about 72% of the solid disc torque (the torque that would be obtained without the slots). With eight slots per lamination, which would be necessary to obtain the same smoothness with only three laminations, the driving torque would only be in the neighborhood of 56% of the solid disc torque. In other words, by obtaining a given smoothness by a larger number of laminations, there is a decided relative gain in driving torque.

It might be assumed from the foregoing reason that it would be better to have eight or nine laminations with three slots each, and under some commercial conditions (as when the manufacturers are more used to handling the laminations) or with some future developments this may be true. At the present time, however, the added inconvenience of handling three or four more laminations per disc, which laminations must be correspondingly thinner, is not believed to be justified by the gain of driving torque, especially since it might be necessary to use thinner separators to avoid increasing the total thickness of the disc.

As a matter of fact, five slots per lamination eliminates the interference slightly more completely than three slots per lamination because with only three slots per lamination one section of the disc will at times be in the vicinity of both driving elements, as is the left-hand section of the disc of Fig. 4. Of course, the magnetic flux is concentrated at the overlapping portions of the poles and therefore very little flux would cut the section which is close to both driving units. In recognition of this fact, the area of the poles of the driving units has been shortened in the diagrammatic Fig. 4. Of course, four slots per lamination would suggest itself as a compromise but with a two-element meter where, as in the present instance, the driving elements are located at diametrically opposed positions, uneven numbers of slots per lamination and laminations per disc are desired so that slots will never be centered under each of the driving units simultaneously. Five slots, therefore, seems to be the ideal number with the meter arrangement shown. This number also has an advantage over three or four slots in connection with a relative gain in damping torque described hereinafter. Another advantage in increasing the number of slots per lamination is that as a result, according to theories which need not be explained here, the fluctuations of torque in each lamination due to the slots therein will be exactly balanced out with a little more perfect uniformity by similar fluctuations in other identical but staggered laminations. An increase in the number of slots also tends to permit the use of larger connecting webs at the center of the disc, with resultant increases in strength. Of course, when the loss of driving torque is not objectionable, more than five slots per lamination may be preferred.

Compact arrangement of parts

In the past it has been customary to provide one damping magnet assembly for each driving element, with a two-disc meter having a driving element on each disc and also having a damping element on each disc. There is then plenty of room for adequate damping magnets to be provided without difficulty. When two driving elements are applied to the same disc, however, there is a very difficult problem in providing adequate damping magnets unless the disc is greatly enlarged. According to the present invention this problem is solved in part by obtaining a high degree of effectiveness from the damping magnets, and in part by an exceedingly compact arrangement of the parts of the meter.

According to the compact arrangement mentioned the driving elements A and B are positioned at opposite sides of the disc as shown in Fig. 1 and in between them are located U-shaped magnets 15, which extend nearly perpendicular from the disc. If only one damping magnet unit is used, the arrangement may be rather triangular, although mounting would not be so easy and the result might not be quite as compact. With the arrangement illustrated it is practical to use a disc having a diameter of only three and one-half inches and, even more important, it is practical to house the entire meter mechanism within the case heretofore commonly used for single phase meters. This obviously results in an enormous saving in cost of production, especially since the single phase bases and covers are turned out in large quantities, and a corresponding saving is made in the wall space required when the meter is mounted on a wall. This is quite important when many meters are mounted in a bank on one wall.

The features of arrangement mentioned are advantageous with any disc, permitting the utilization of all of the available space within the horizontal limits of the meter disc, thereby permitting the use of conventional driving elements. As a matter of fact, it is contemplated to use the same driving elements as will be used in single phase meters. A suitable frame, not shown, may be provided having a portion approximately over the center of the disc for supporting such parts of the mechanism as are not supported directly by the base. Suitable driving elements and a suitable frame are shown in applicant's copending application, Serial No. 70,951, the driving element being substantially the same as that covered in applicant's copending application Serial No. 48,713, but the details thereof are not in themselves a subject of the claims appearing hereinafter.

Effective damping magnet arrangement

In getting adequate damping torque from the permanent magnets used in watt-hour meters, applicant has found that, especially with a slotted disc, it is an important consideration to have two concentrated magnetic fields extending through the disc in close proximity and in opposite polarity so that as a given portion of the meter disc passes through the two fields, it will move very suddenly from a strong magnetic field of one polarity to the strong magnetic field of the reverse polarity. According to one feature of the present invention this is accomplished by providing a magnet 15 with its pole pieces (preferably approximately $\frac{5}{16}$ inch apart) adjacent one face of the disc and providing a fixed armature 51 alined with the pole pieces, but adjacent the opposite face of the meter disc.

The magnetic flux from the magnet 15 may therefore be regarded as passing downwardly from one pole piece through the disc, laterally through the magnetic armature 51, and upwardly through the disc to the other pole piece, thus providing the two opposed magnetic fields traversing the disc in close proximity. The resulting opposed fields co-operate with one another in the sense that each causes the other to fall off abruptly from a point of maximum flux immediately under its pole to a point of zero flux midway between the poles. In order to provide adequate damping torque for two driving elements, two such damping magnet units may be provided, located on opposite sides of the disc so that either a damping magnet or a driving magnet is centered every 90° around the disc. With this arrangement nearly all of the parts mentioned are approximately within the cylindrical space subtended by the disc so that, as previously stated, the entire meter mechanism can be mounted in a case now used for single phase meters. This results in great economies without loss of accuracy, and is made possible by the invention here disclosed of a single disc which can be acted on by two driving elements without interference.

It will be observed that with this compact arrangement of parts the damping magnets are quite close to the driving magnets. Not only does this require shaping the magnets to fit in the space available, but it introduces a danger of permanent weakening of the magnets due to abnormal surges in the magnetic fields emanating from the driving magnets. As discussed fully in applicant's copending application, Serial No. 70,951, this problem is solved by the use of high coercive magnetic material such as that known commercially as "Alnico", or other magnetic materials referred to in said copending application which are not in themselves a subject of the claims appearing hereinafter. Because such a material has a coercive force several times that of the chrome steel heretofore used in watt-hour meters, it may be made immune to any stray field surges resulting from causes which do not wreck the meter as a whole. Also, this unusual magnetic strength permits the use of magnets having only a small fraction of the length that would otherwise be necessary.

The compactness of the meter also increases the likelihood of interference between the elements due to the fact that each element is within the magnetic field of the other element. This source of interference caused by mutual induction between elements is of course minor compared to the interference caused by eddy currents which would flow in a solid disc from the gap of one driving element to the gap of the other, and which is substantially eliminated by the slotted disc as previously discussed. When necessary, this additional cause of interference may be substantially eliminated by the provision of a magnetic shield between the driving elements. No such shield has been illustrated, however, since its use is optional. Indeed, the damping magnets, themselves being of a magnetic material and being located between the two electromagnets, act to a considerable degree as shields to cut down the alternating current mutual inductive effect between electromagnets.

Relative gain in damping torque

One important feature which facilitates obtaining adequate damping torque may be referred to as a "relative gain in damping torque". This relative gain is obtained when a slotted disc is used in a meter having adjacent opposed damping fields. Although the use of a slotted disc or a disc with slotted laminations decreases the driving torque, this ordinarily undesirable decrease will have a decided advantage in instances when the damping arrangement above discussed does not in itself provide adequate damping torque, as when the possibilities of the compact arrangement and adjacent opposed fields are not fully utilized or when it is desired to use smaller magnets for economy. With the preferred damping magnets of this invention the damping torque is not decreased by the slots as much as the driving torque and therefore there is a relative gain of damping torque. The reason for this differential need not be explained at length, but applicant has found that it does exist, due to the differences in the characters of the driving magnets and the damping magnets in acting on the disc. The use of a damping magnet system having opposed adjacent fields is necessary to get the full benefit of this result. The closer the opposed damping fields, the better the result. The results illustrated in Fig. 5 were obtained for the typical damping magnets illustrated with the pole faces separated, as previously mentioned, by approximately $\frac{1}{16}$ inch.

Figure 5:
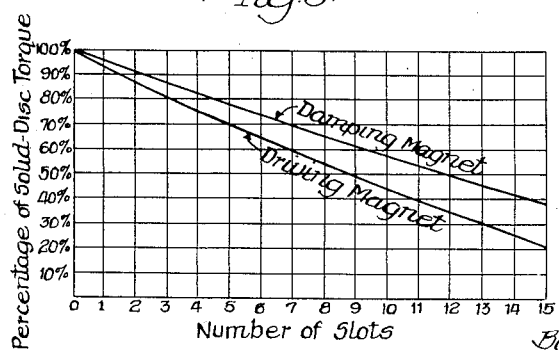
Fig. 5 is a graph showing the decrease of driving torque and the smaller decrease of damping torque as the number of slots is increased for a preferred and typical form of driving element operated with the preferred form of damping magnets shown.

The lower line in the chart of Fig. 5 shows, for example, that with nine slots the driving torque is just about 50% of what it would be with a conventional solid disc, while the upper line shows that with the same nine slots the damping torque would be about 62% of what it would be with a solid disc. In other words, the damping torque is relatively over 20% higher than the driving torque, or the efficiency of the disc as to damping magnets is over 20% higher than the efficiency of the disc as to the driving magnets. There is a relative gain in damping torque of 20%. With laminations having five slots, the relative gain is about 8%. These figures hold, of course, for one particular commercial design of driving magnets and damping magnets under test but are illustrative and typical of the general principle.

In contrast and by way of explanation, if the opposing damping magnetic fields were widely separated, their effect on the disc could even be relatively less effective than the driving magnets. That is, there would be a relative loss of damping torque instead of a relative gain. Also if any ordinary single uni-directional damping field were used the result could be less effective than the driving magnets as the number of slots per lamination increased. One uni-directional field tested with a disc having five slots per lamination has shown a loss of about 36% and a relative loss as compared to the driving magnet of 9%. These adverse effects would be in addition to the loss of damping efficiency, even on a solid disc, which would be caused by widely separating the opposed damping fields or by using a uni-directional field. For these reasons, closely adjacent and opposing magnetic damping fields are of great importance in securing a successful result with a slotted disc and where the general arrangement gives limited room for the damping units and where the amount of torque delivered to the disc by the two driving units is large.

Operation

The operation of this invention will be clear to those skilled in the art from the foregoing description and the drawings. Each of the driving units A and B will tend to rotate the disc according to the power used in the circuits measured thereby. The damping magnets 15 with the help of the fixed armatures 51 will so oppose the rotation of the disc that its rotation will be proportional to the power consumed, which will be indicated by a register, not shown, operated by the disc. The damping strength will be efficient in practice, in spite of the weakening effect of the slots, because of the provision of adjacent opposed fields.

Because the disc is made up of a plurality of substantially isolated and staggered segments each of which lies adjacent only one driving unit at a time, there will be no interference between elements, and because of the large number of such staggered segments, the disc will operate smoothly and accurately. The disc is made practical commercially, in spite of the stringent requirements for a disc, by securing the laminations together with a polymerizable insulating binding material, and by eliminating improper contacts between the laminations with a non-flowable spacing layer.

Although but a few embodiments of my invention have been herein shown and described, it is to be understood that the invention is not limited thereby, but is to be limited only by the following claims with the broadest interpretation and range of equivalents permitted by the prior art. The term "watt-hour meter mechanism" is intended to define such a mechanism even if used in relays or other electrical equipment.

I claim:

1. A watt-hour meter mechanism comprising a plurality of electromagnetic driving elements and a disc driven by these elements, said disc having a plurality of conducting sections electrically separated from each other sufficiently to substantially confine the currents induced therein by the driving elements to the individual sections and having an area and shape with reference to the disc such that when under the magnetic influence of one driving element they are removed from any substantial magnetic influence of another driving element, said sections being angularly spaced in staggered and overlapping relation in their assembly in the disc, the overlapping sections being separated from and firmly secured to one another by an interposed layer of insulating binding material.

2. An electric watt-hour meter mechanism for polyphase measurements, including a rotatively mounted disc capable of continuous rotation about a given axis, and a plurality of electromagnetic driving elements angularly spaced around said axis and positioned to actuate said disc by induction, said disc passing through gaps in said elements and including alternate layers of conductive material and insulating binding material forming a rigid unitary structure; each lamination including at least three sections substantially electrically separated by generally radial slots, said laminations being adequately insulated from one another at at least all portions of the disc except its center portion and having their slots staggered angularly about the disc; said disc being not over approximately .06 inch thick and at least three-fourths of its thickness being composed of electrically conductive metal.

3. A watt-hour meter mechanism comprising a plurality of electromagnetic driving elements and a disc driven by these elements and passing through gaps therein, said disc having a plurality of conducting sections electrically separated from each other sufficiently to substantially confine the currents induced therein by the driving elements to the individual sections and having an area and shape with reference to the disc such that when under the magnetic influence of one driving element they are removed from any substantial magnetic influence of another driving element, said sections being angularly spaced in staggered and overlapping relation in their assembly in the disc, the overlapping sections being separated from and firmly secured to one another at their outer annular portions while maintaining electrical separation at these portions and the disc being not over approximately .06 inch thick and at least three-fourths of its thickness being composed of electrically conductive metal at the portions of the disc passing through said gaps.

4. An electric watt-hour meter mechanism for polyphase measurements, including a rotatively mounted disc capable of continuous rotation about a given axis, and a plurality of electromagnetic driving elements angularly spaced around said axis, said disc including a plurality of conducting sections substantially electrically separated from each other sufficiently to confine the currents induced therein by the driving elements to substantially the individual sections and having an area and shape with reference to the disc such that when under the magnetic influence of one driving element they are removed from any substantial magnetic influence of another driving element, said sections being angularly spaced in staggered and overlapping relation in their assembly in the disc, the overlapping sections being firmly secured together by an insulating binding material and being separated by a layer of material which is inherently substantially non-flowable whereby it is capable of serving as a dependable spacer during assembly under pressure.

5. An electric watt-hour meter mechanism for polyphase measurements, including a rotatively mounted disc capable of continuous rotation about a given axis, and a plurality of electromagnetic driving elements angularly spaced around said axis and positioned to actuate said disc by induction, said disc including a plurality of conducting sections substantially electrically separated from each other sufficiently to confine the currents induced therein by the driving elements to substantially the individual sections and individually having an area and shape with reference to the disc such that when under the magnetic influence of one driving element they are removed from any substantial magnetic influence of another driving element, said sections being angularly spaced in staggered and overlapping relation in their assembly in the disc, the overlapping sections being separated from and firmly secured to one another by an interposed layer including a polymerized insulating binding material.

6. An electric watt-hour meter mechanism for polyphase measurements including a rotatively mounted disc capable of continuous rotation about a given axis, and a plurality of electromagnetic driving elements angularly spaced around said axis and positioned to actuate said disc by induction, said disc including at least five laminations and from three to seven sections in each lamination, said sections being of sufficiently small angular extent individually to be substantially acted upon by only one of said driving elements at a time, being substantially electrically isolated from one another as to currents induced by said elements, and being spaced substantially uniformly around said axis.

7. An electric watt-hour meter mechanism for polyphase measurements, including a rotatively mounted disc capable of continuous rotation about a given axis, and a plurality of electromagnetic driving elements angularly spaced around said axis and positioned to actuate said disc by induction, said disc including at least fifteen overlapping and staggered sections each of at least approximately 52° and not over approximately 120° angular extent about said axis, said sections being of sufficiently small angular extent individually to be substantially acted upon by only one of said driving elements at a time, being substantially electrically isolated from one another as to currents induced by said elements, and being spaced substantially uniformly around said axis.

8. An electric watt-hour meter mechanism for polyphase measurements including a rotatively mounted disc capable of continuous rotation about a given axis, and a plurality of electromagnetic driving elements angularly spaced around said axis and positioned to actuate said disc by induction, said disc including a plurality of overlapping conductive sections of small enough angular extent individually to be substantially acted upon by only one of said driving elements at a time, substantially electrically isolated from one another as to currents induced by said elements, and spaced substantially uniformly around said axis, and damping magnet means constructed and positioned to produce cooperating concentrated fields passing through said sections in opposite directions at two closely associated points substantially the same distance from the axis of the disc.

9. An electric watt-hour meter mechanism for polyphase measurements, including a rotatively mounted disc capable of continuous rotation about a given axis, and a plurality of electro-magnetic driving elements angularly spaced around said axis and positioned to actuate said disc by induction, said disc including a plurality of overlapping conductive sections of small enough angular extent individually to be substantially acted upon by only one of said driving elements at a time, substantially electrically isolated from one another as to currents induced by said elements, and spaced substantially uniformly around said axis, a damping magnet substantially within a cylindrical space subtended by the disc, extending steeply away from the disc, and having its poles close enough together to produce co-operating opposed fields and both adjacent the same face of the disc and spaced substantially equally from said axis, and an armature opposite said poles and adjacent the opposite face of said disc and constituting a low reluctance path for causing the flux to pass through the disc in opposite directions in passing from one pole of the magnet to the other.

10. An electric watt-hour meter mechanism including a disc mounted for continuous rotation about a given axis, a plurality of driving elements acting on said disc and having approximately parallel core structures adjacent diametrically opposed sides of the disc, a pair of damping magnets positioned at approximately diametrically opposed sides of the disc and approximately midway angularly between the driving elements, each damping magnet being substantially within a cylindrical space subtended by the disc, extending steeply away from the disc, and having its poles close enough together to produce co-operating opposed fields and both adjacent the same face of the disc and spaced substantially equally from said axis, and an armature opposite said pole and adjacent the opposite face of said disc and constituting a low reluctance path for causing the flux to pass through the disc in opposite directions in passing from one pole of the magnet to the other.

11. An electric watt-hour meter mechanism including a disc mounted for continuous rotation about a given axis, a plurality of driving elements acting on different portions of said disc, said disc including at least approximately fifteen overlapping and staggered conductive sections of at least approximately 52° and not over approximately 120° angular extent about said axis but small enough in angular extent to be substantially acted on by only one driving element at a time, substantially electrically isolated from one another as to currents induced by said elements, separated from and firmly secured to overlapping sections by a layer including a preformed insulating sheet and a polymerized insulating binding material and damping magnet means constructed and positioned to cause concentrated flux to pass through said sections in opposite directions at two closely associated points substantially the same distance from the axis of said disc.

12. An electric watt-hour meter for polyphase measurements, including a rotatively mounted disc capable of continuous rotation about a given axis, and a plurality of electromagnetic driving elements angularly spaced around said axis and positioned to actuate said disc by induction, said disc including at least fifteen overlapping and staggered sections each of at least approximately 52° and not over approximately 120° angular extent about said axis, said sections being of sufficiently small angular extent individually to be substantially acted upon by only one of said driving elements at a time, being substantially electrically isolated from one another as to currents induced by said elements, and being spaced substantially uniformly around said axis, said disc being not over approximately .06 inch thick and at least three-fourths of its thickness being composed of electrically conductive metal.

STANLEY S. GREEN.